United States Patent
Dong et al.

(10) Patent No.: US 6,701,753 B2
(45) Date of Patent: Mar. 9, 2004

(54) METHOD AND APPARATUS FOR MAKING IMPROVED OPTICAL FIBER PREFORMS AND OPTICAL FIBER THEREFROM

(75) Inventors: Xiaoyuan Dong, Suwanee, GA (US); Siu-Ping Hong, Alpharetta, GA (US)

(73) Assignee: Fitel USA Corp., Norcross, GA (US)

( * ) Notice: Subject to any disclaimer, the term of this patent is extended or adjusted under 35 U.S.C. 154(b) by 394 days.

(21) Appl. No.: 09/781,515

(22) Filed: Feb. 11, 2001

(65) Prior Publication Data

US 2002/0108403 A1 Aug. 15, 2002

(51) Int. Cl.[7] .............................................. C03B 37/025
(52) U.S. Cl. ............................. 65/412; 65/435; 65/484
(58) Field of Search ........................ 65/377, 379, 382, 65/384, 412, 435, 484, 489, 530, 533

(56) References Cited

U.S. PATENT DOCUMENTS

| | | | | |
|---|---|---|---|---|
| 3,791,806 A | * | 2/1974 | Koizumi et al. | 65/405 |
| 4,217,027 A | * | 8/1980 | MacChesney et al. | 350/96.3 |
| 4,578,096 A | * | 3/1986 | Siegmund | 65/405 |
| 4,578,101 A | * | 3/1986 | Clark et al. | 65/109 |
| 4,602,926 A | * | 7/1986 | Harrison et al. | 65/3.11 |
| 4,820,322 A | * | 4/1989 | Baumgart et al. | 63/3.11 |
| 5,578,106 A | * | 11/1996 | Fleming et al. | 65/391 |
| 5,850,497 A | * | 12/1998 | Fleming et al. | 385/123 |
| 6,053,013 A | * | 4/2000 | Oh et al. | 65/412 |
| 6,105,396 A | * | 8/2000 | Glodis et al. | 65/377 |
| 2002/0134113 A1 | * | 9/2002 | Berkey | 65/397 |

FOREIGN PATENT DOCUMENTS

| | | | |
|---|---|---|---|
| EP | 1129999 | 9/2001 | |
| EP | 1156018 | 11/2001 | |
| EP | 1182173 | 2/2002 | |
| WO | 97/30944 | * 8/1997 | C03B/27/27 |

* cited by examiner

Primary Examiner—Steven P. Griffin
Assistant Examiner—Carlos Lopez
(74) Attorney, Agent, or Firm—John M. Harman

(57) ABSTRACT

Embodiments of the invention include a method and apparatus for making optical fiber preforms and optical fiber. The method includes the steps of positioning an overclad tube around a preform core rod, heating the overclad tube along the length thereof in the presence of a pressure gradient to collapse onto the preform core to form the overclad optical fiber preform, and adjusting the radial size of a heated portion of the preform core rod and/or the overclad tube to actively match the radial dimensions of the preform core rod along the length thereof with corresponding portions of the overclad tube. The active matching reduces variations in the physical dimensions of the preform core rod and/or the overclad tube, which improves transmission and other performance characteristics of fiber drawn from the created preform, e.g., by maintaining a relatively constant D/d ratio of the preform.

13 Claims, 3 Drawing Sheets

METHOD AND APPARATUS FOR MAKING IMPROVED OPTICAL FIBER PREFORMS AND OPTICAL FIBER THEREFROM

BACKGROUND OF THE INVENTION

1. Field of the Invention

The invention relates to methods and apparatus for making optical fiber preforms. More particularly, the invention relates to Rod-In-Tube (RIT) methods and apparatus having improved matching of preform core rods and overclad tubes.

2. Description of the Related Art

Optical fibers are thin strands of glass or plastic capable of transmitting optical signals containing relatively large amounts of information over long distances with relatively low attenuation. Optical fibers typically are made by heating and drawing a portion of an optical preform comprising a refractive core surrounded by a protective cladding made of glass or other suitable material. Conventionally, several processes exist for fabricating preforms, including a modified chemical vapor deposition (MCVD) process. See, e.g., U.S. Pat. No. 4,217,027, which is issued to MacChesney et al. on Aug. 12, 1980 and co-owned with this application. Other conventional processes include vapor axial deposition (VAD), outside vapor deposition (OVD) and plasma chemical vapor deposition (PCVD).

In the MCVD process, precursor gases such as $SiCl_4$ and $GeCl_4$ pass through a rotating substrate tube of silica glass. A torch heats the tube from the outside as the precursor gases pass therethrough, causing deposition of submicron-sized glass particles on the inside surface of the tube. Movement of the torch along the longitudinal axis of the tube in a plurality of passes builds up layer upon layer of glass to provide a preform tube. Once a suitable number of layers have been deposited, the preform tube is heated to cause it to collapse into a solid rod typically referred to as a preform rod, a core rod or a preform core rod. The preform core rod then is inserted into a glass overclad tube, which is collapsed onto the preform core rod using heat and a pressure gradient present about the overclad tube. Such process typically is referred to as the Rod-In-Tube (RIT) process. See, e.g., U.S. Pat. No. 4,820,322, which is co-owned with this application, and hereby is incorporated by reference herein.

The resulting preform or overclad preform has a core region with a first diameter (d) surrounded by a cladding region with a second or outer diameter (D). The ratio of the cladding region diameter (D) to the core region diameter (d), known as D/d, is useful in determining various performance parameters of optical fiber made from that preform. For example, to obtain optical fiber having desired transmission characteristics, the D/d ratio should be within an acceptable, but relatively narrow, range of values.

Because the range of acceptable values for this ratio typically is relatively narrow, variations in the particular physical dimensions of the core region and the cladding region, especially diameter and cross-sectional area (CSA), greatly affect the overall performance of optical fiber drawn from the preform. However, conventional methods for producing preform core rods (e.g., MCVD and VAD) do not always yield preform core rods with constant diameters or cross-sectional areas along the entire length of the preform core rod. Similarly, conventional methods for producing RIT overclad tubes do not always yield tubes with constant diameters or cross-sectional areas from one end to the other.

Accordingly, techniques such as passive tube matching are used to reduce the effects that variations in physical dimensions of conventionally-made preform core rods and overclad tubes have on the D/d ratio of the preform, and ultimately on the transmission and other performance characteristics of fiber drawn from the preform. Passive tube matching involves pairing up or matching preform core rods with overclad tubes that are dimensioned similarly or whose dimensional variations are similar. For example, a preform core rod whose average diameter or cross-sectional area (based on a number of measurements taken along the length of the preform core rod) is within a given percentage range lower than its normal or preferred value will be used with an overclad tube whose corresponding diameter or cross-sectional area also is within a given percentage range lower than its normal or preferred value. In this manner, in general, preform core rods that, on average, are smaller than normal will be inserted in overclad tubes that, on average, also are smaller than normal by a similar percentage. Such passive tube matching generally improves the dimensional consistency of the preform and thus tends to improve the quality and yield of the optical fiber drawn therefrom.

However, although passive tube matching offers some improvement of optical fiber quality and yield, it would be desirable to have available other methods and devices that further improve the dimensional consistency of the preform core and cladding regions with respect to one another, thus further improving the quality and yield of optical fiber drawn from the preforms.

SUMMARY OF THE INVENTION

The invention is embodied in a method and apparatus for making optical fiber preforms and for making optical fiber from the preforms. The method includes the steps of positioning an overclad tube around a preform core rod, heating the overclad tube along the length thereof in the presence of a pressure gradient to collapse onto the preform core to form the overclad optical fiber preform, and adjusting the radial size of a heated portion of the preform core rod and/or the overclad tube to actively match the radial dimensions of the preform core rod along the length thereof with corresponding portions of the overclad tube. The adjusting step varies the radial size of a portion of the preform core rod and/or the overclad tube, e.g., by applying compressive force to increase the radial dimensions by decreasing the axial dimensions and, alternatively, by also applying a drawing force to decrease the radial dimensions by increasing the axial dimensions (of the preform core rod and/or the overclad tube). The compressive and/or decompressive forces are applied, e.g., as the region of interest of the preform core rod and the overclad tube are being heated for the collapse of the overclad tube onto the preform core rod. The active matching afforded by the adjusting step reduces variations in the physical dimensions of the preform core rod and/or the overclad tube, which improves transmission and other performance characteristics of fiber drawn from the created preform, e.g., by maintaining a relatively constant D/d ratio of the preform.

DETAILED DESCRIPTION

Figure 1:
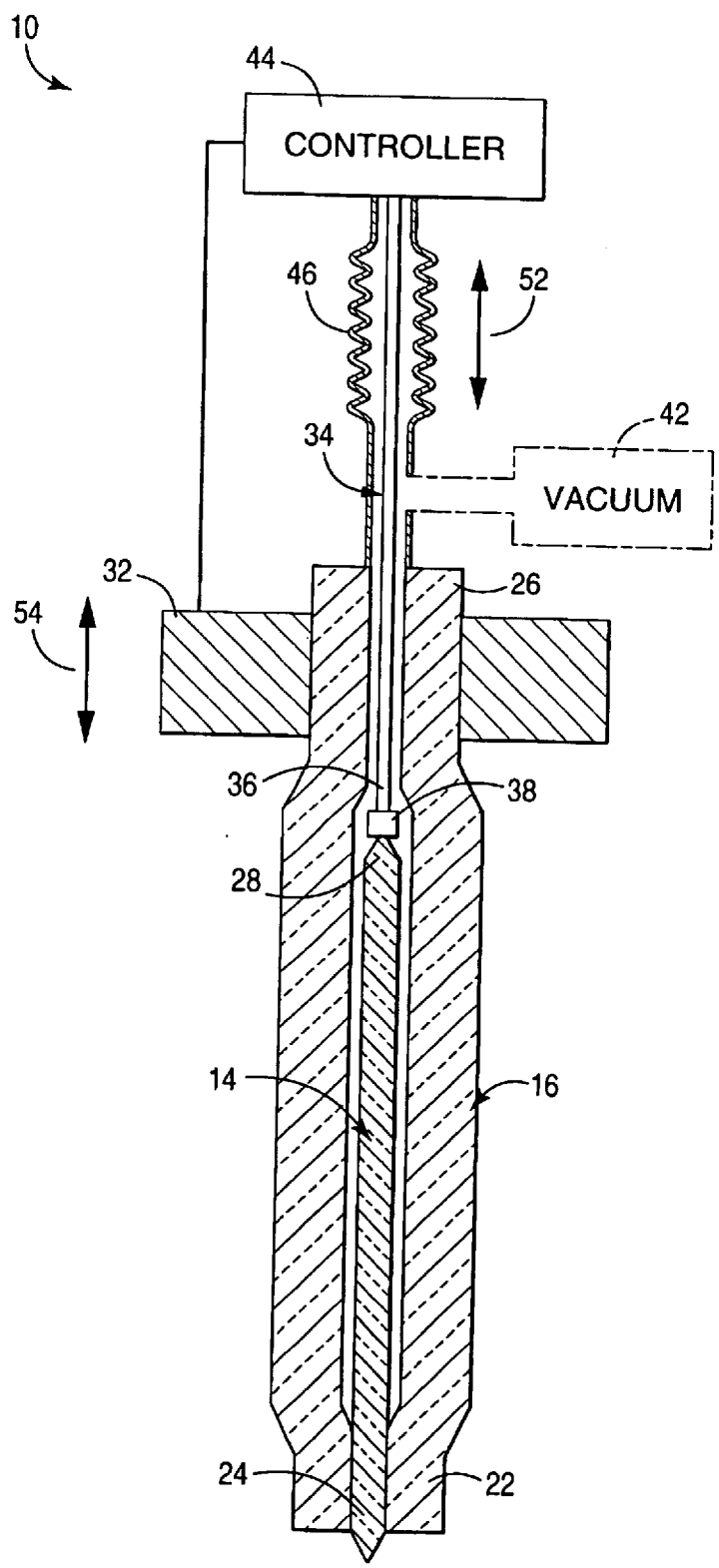
FIG. 1 is a cross-sectional view of an apparatus for making an optical fiber preform according to embodiments of the invention, showing a preform core rod positioned within an overclad tube prior to collapsing the overclad tube around the preform core rod to make the preform.

In the following description similar components are referred to by the same reference numeral to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is an apparatus 10 for making an overclad preform using a Rod-In-Tube (RIT) process according to embodiments of the invention. A preform core rod 14 (also referred to as a preform rod or a core rod) is positioned within an overclad tube 16. The preform core rod 14 is made by any suitable process, including conventional processes such as modified chemical vapor deposition (MCVD) or vapor axial deposition (VAD). A first end 22 of the overclad tube 16 is sealed to a first end 24 of the preform core rod 14, e.g., by collapsing a portion of the overclad tube 16 onto the preform core rod 14 using appropriate heat and pressure. A second end 26 of the overclad tube 16 is configured for mounting into a support 32 or other suitable holding device or chuck.

An adjustable spacer 34 or other suitable spacing means is positioned within the second end 26 of the overclad tube 16 to provide positional support to the preform core rod 14. The distal end 36 of the adjustable spacer 34 includes, e.g., a quartz disc 38, or other suitable structure to interface with a second end 28 of the preform core rod 14. Alternatively, the distal end of the adjustable spacer 34 contacts the second end 28 of the preform core rod 14 directly. As will be discussed in greater detail hereinbelow, according to embodiments of the invention, the spacer 34 is configured to apply compressive force and/or drawing force to the preform core rod 14, e.g., as the overclad tube 16 is being collapsed onto the preform core rod 14.

A vacuum source 42 or other suitable device or arrangement establishes a pressure gradient across the region between the overclad tube 16 and the preform core rod 14 to assist in collapsing the overclad tube 16 onto the preform core rod 14. Heating the overclad tube 16 while maintaining the pressure gradient between the overclad tube 16 and the preform core rod 14 causes the overclad tube 16 to collapse around the preform core rod 14, e.g., in accordance with a conventional Rod-In-Tube (RIT) process.

In the arrangement shown, the spacer 34 is included or contained within the established vacuum environment. The spacer 34 is coupled to a controller 44 such as a motor drive or other suitable means for controlling the movement of the spacer 34. For example, the spacer 34 is coupled to the controller 44 through a bellows 46 that allows for generally axial movement of the spacer 34 (shown generally by an arrow 52) to apply compressive force and/or drawing force to the preform core rod 14.

Alternatively, compressive force and/or drawing force are applied to the overclad tube 16, e.g., by the support 32 or other holding device or suitable force-applying arrangement. The support 32 or other force-applying means is configured to move in directions generally shown by an arrow 54 to apply compressive force and/or drawing force to the overclad tube 16, which is mounted in the support 32. The controller 44 or other suitable controlling arrangement is coupled to the support 32 or other force-applying means to control the movement thereof.

According to embodiments of the invention, applying compressive and/or drawing force to the preform core rod 14 and/or the overclad tube 16 varies the radial size (e.g., the diameter and/or cross-sectional area) of the preform core rod 14 and/or the overclad tube 16, e.g., as the overclad tube 16 is collapsed onto the preform core rod 14. More specifically, a compressive force generally increases the radial size of the preform core rod 14 and/or the overclad tube 16 by reducing the axial length thereof. Conversely, a drawing (or stretching) force generally decreases the radial size of the preform core rod 14 and/or the overclad tube 16 by increasing the axial length thereof.

In this manner, embodiments of the invention actively affect and control the radial size of the preform core rod 14 and/or the overclad tube 16 and their relative positions with respect to one another, thus providing for more active matching of the dimensions of the preform core rod 14 and/or the overclad tube 16 at various axial locations therealong. Typically, the physical dimensions of the preform core rod 14 and the overclad tube 16 are determined before the preform core rod 14 is inserted into the overclad tube 16. Such information is made available to the controller 44. In this manner, the controller 44 controls the radial size of the preform core rod 14 and/or the overclad tube 16 based on the dimensions thereof. This active matching works to reduce variations in the physical dimensions of the preform core rod 14 and/or the overclad tube 16. Such reductions improve the transmission and other performance characteristics of fiber drawn from the created preform, e.g., by maintaining a constant D/d ratio of the preform.

Figure 2:
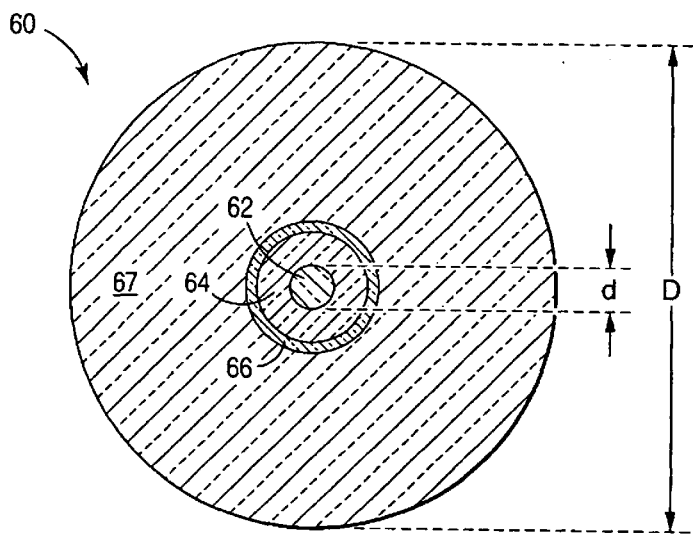
FIG. 2 is a cross-sectional view of an optical fiber preform showing the dimensions of the core region and the cladding region.

Referring now to FIG. 2, a cross-sectional view of an optical fiber preform 60 showing the dimensions of the core region and the cladding region is shown. The optical fiber preform include a deposited core region 62 with a first diameter (d), surrounded by a first or deposited cladding region 64. The core region 62 and the first cladding region 64 are built layer by layer, e.g., within the inside of a substrate tube 66 and then the tube 66 is collapsed to form a solid rod. Surrounding the solid rod is an overcladding region 67, which has an outer diameter (D).

As discussed previously hereinabove, the ratio of the cladding region diameter (D) to the core region diameter (d), known as D/d, is useful in determining various performance parameters of optical fiber made from that preform, including the overall quality and yield of optical fiber made from the preform. For example, D/d affects the cutoff wavelength of the optical fiber made from that preform. The cutoff wavelength is the wavelength above which the optical fiber behaves like a (step-index) multimode fiber and below which behaves like a single mode fiber. Also, D/d affects the mode field diameter (MFD), which is a measure of the width of the light intensity in a single mode fiber (also known as the spot size).

To draw optical fiber having desired transmission characteristics, the D/d ratio of the preform should be within an acceptable, but relatively narrow, range of values. For example, D/d often is desired to be within the range from approximately 4 to approximately 6. However, depending on the particular application for the fiber, other values and ranges often are acceptable or desired.

Figure 3:
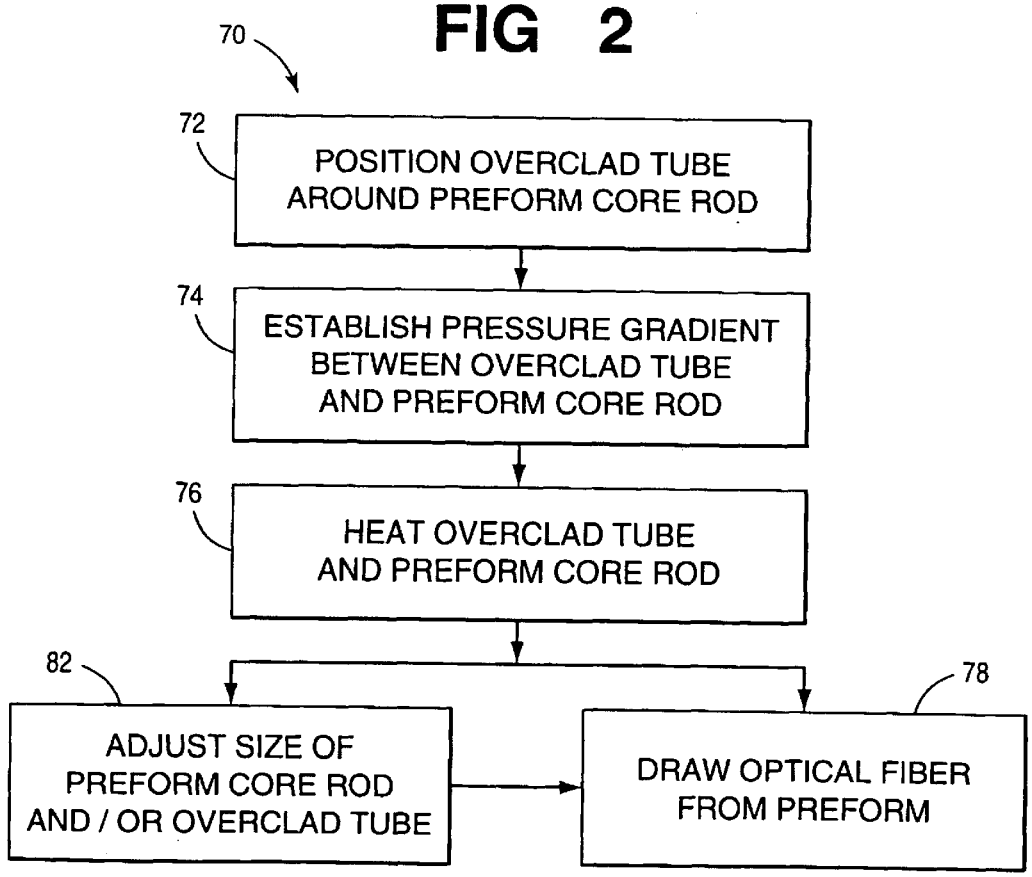
FIG. 3 is a simplified block diagram of a method for making an optical fiber preform and making optical fiber therefrom according to embodiments of the invention.

Referring now to FIG. 3, with continuing reference to FIGS. 1–2, a method 70 for making an optical fiber preform according to embodiments of the invention is shown. One step 72 of the method 70 is to position or otherwise form the overclad tube 16 around the preform core rod 14. For example, as shown in FIGS. 1–2, when positioned, the overclad tube 16 generally is coaxial with the preform core rod 14.

Another step 74 of the method 70 is to establish a pressure gradient across the overclad tube, i.e., between the preform core rod 14 and the overclad tube 16. As discussed hereinabove, one end of the preform core rod 14 and a corresponding end of the overclad tube typically are sealed off, e.g., by collapsing a portion of the overclad tube 16 onto a portion of the preform core rod 14. For example, as shown in FIG. 1, a portion of the first end 22 of the overclad tube 16 is collapsed onto a portion of the first end 24 of the preform core rod 14. The pressure gradient is established between the preform core rod 14 and the overclad tube using, e.g., the vacuum source 42 or other suitable means. Typically, the pressure outside of the overclad tube 16 is greater than the pressure between the outside of the preform core rod 14 and the inside of the overclad tube 16. For example, the pressure gradient is within the range from approximately 0.10 to approximately 0.50 atmospheric pressure.

Another step 76 of the method 70 is to heat the preform core rod 14 and the overclad tube 16, e.g., within the range from approximately 1600–1700° C. For example, the heating step 76 applies heat to successive axial portions of the overclad tube 16, i.e., along the axial length of the overclad tube 16. The heating step 76 causes the heated portion of the overclad tube 16 to collapse onto the corresponding portion of the preform core rod 14, thus partially forming an overclad optical fiber preform. In this manner, the entire overclad tube 16 is collapsed onto the preform core rod 14, thus forming an overclad optical fiber preform, e.g., the optical fiber preform core rod 14 shown in FIG. 2.

Another step 78 of the method 70 is to draw optical fiber from the heated portion of the optical fiber preform. The drawing step 78 is performed, e.g., once the inventive optical fiber preform has been manufactured. Alternatively, in an overclad during draw (ODD) process, the drawing step 78 is performed as the overclad optical fiber preform is being formed, i.e., as the overclad tube 16 is being collapsed onto the preform core rod 14 within the draw tower furnace. Such alternative embodiments will be discussed in greater detail hereinbelow, e.g., with reference to FIG. 4.

According to embodiments of the invention, another step 82 of the method 70 is to vary or adjust the radial size of the preform core rod 14 and/or the overclad tube 16, e.g., by applying compressive force and/or drawing force to axial portions of the preform core rod 14 and/or the overclad tube 16 at various times during the collapse of the overclad tube 16 onto the preform core rod 14. For example, compressive and/or drawing forces are applied typically as the axial portion of the preform core rod 14 and/or the overclad tube 16 whose radial size is to be adjusted has been heated. In this manner, the applied forces adjust the radial size of the axial portion of the preform core rod 14 and/or the overclad tube 16, e.g., just prior to the collapse of that axial portion of the overclad tube 16 onto the corresponding axial portion of the preform core rod 14. The radial size includes, e.g., the diameter and/or the cross-sectional area.

For example, in the arrangement shown in FIG. 1, the controller 44 or other suitable means urges the spacer 34 (with or without the quartz disc 38) to apply compressive force axially onto the preform core rod 14. In this manner, the preform core rod 14 tends to compress axially, especially at locations along the length of the preform core rod 14 that have been heated and are relatively malleable. Such compression causes an increase in the diameter, cross-sectional area or other radial size of the preform core rod 14, especially at heated, malleable locations along the length of the preform core rod 14. Thus, depending on when the compressive force is applied, and depending on which axial portion or portions of the preform core rod 14 are heated, the radial dimensions of the preform core rod 14 are adjusted as desired, e.g., with respect to a corresponding location of the overclad tube 16.

Similarly, the arrangement for making optical fiber preforms also is configurable to apply drawing force that pulls or stretches the axial length of the preform core rod 14 at various times and at various locations along the length of the preform core rod 14. In this manner, the preform core rod 14 tends to decompress axially, especially at heated locations along the length of the preform core rod 14. The decompression tends to decrease the radial size of the preform core rod 14.

It should be noted that, in arrangements such as that shown in FIG. 1, in the absence of the spacer or other support means, the tendency for the preform core rod 14 is to move toward the second end of the overclad tube 16. Thus, arrangements such as those shown in FIG. 1 typically control the compression and decompression by controlling only the degree of compressive force applied to the preform core rod 14. However, embodiments of the invention also include arrangements in which compression and decompression is controlled by controlling both the compressive force and the drawing force applied to the preform core rod 14 and/or overclad tube 16. As discussed previously herein, the application of compressive and/or drawing forces is controlled by the controller 44 or other suitable means.

Also, alternatively, the controller 44 controls the application of compressive and/or drawing forces to the overclad tube 16, e.g., through the support 32 or other appropriate means. That is, the support 32 or other suitable means coupled to the overclad tube 16 applies compressive and/or drawing force to the overclad tube 16, as discussed hereinabove. According to embodiments of the invention, the controller 44 is coupled to the support 32 or other suitable means and controls movement thereof, which, in turn, controls the application of the compressive and/or drawing forces to the overclad tube 16. The application of compressive and/or drawing forces to the overclad tube 16 occurs alone or in addition to the application of compressive and/or drawing force to the preform core rod 14.

As discussed previously herein, the adjusting step 82 allows for active matching of the preform core rod 14 and its surrounding overclad tube 16 (which subsequently is collapsed therearound). More specifically, the adjusting step 82 actively matches radial dimensions of the preform core rod 14 and corresponding portions of the surrounding overclad tube 16, thus improving dimensional consistency therebetween during the RIT process.

Embodiments of the invention have been discussed hereinabove as part of arrangements in which the collapse of the overclad tube 16 onto the preform core rod 14 typically is performed while the overclad tube and the preform core rod are mounted in a vertical lathe. However, embodiments of the invention are useful with alternative arrangements, including Overclad During Draw (ODD) arrangements.

In ODD arrangements, the collapse of the overclad tube 16 on the preform core rod 14 is performed in a draw tower furnace, which also is used to draw optical fiber from the resulting optical fiber preform. Such collapse is accomplished by inserting the preform core rod 14 into an overclad tube 16 and then moving the combined preform core rod and overclad tube coaxially through the draw tower furnace, which causes collapse of the overclad tube onto the preform core rod prior to the drawing of the fiber. Embodiments of the invention are useful with such arrangements.

As discussed previously hereinabove, the drawing step 78 of the method 70 typically is performed once the optical fiber preform has been manufactured. However, in an overclad during draw (ODD) process, the drawing step 78 is performed as the overclad optical fiber preform is being formed, i.e., as the overclad tube 16 is being collapsed onto the preform core rod 14 within the draw tower furnace. The portion of the overclad tube 16 collapsed onto a corresponding portion of the preform core rod 14 becomes the portion of the preform that is ready for being drawn into an optical fiber.

Figure 4:
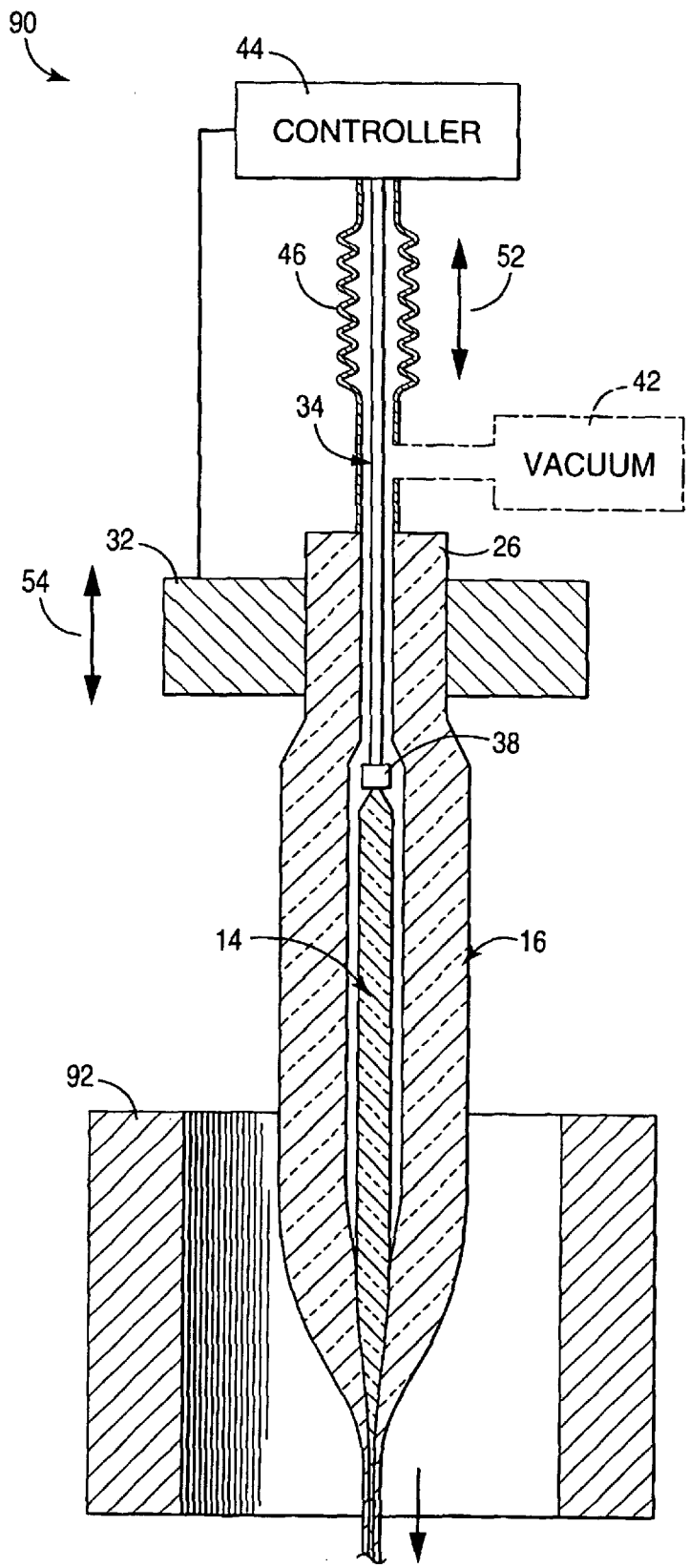
FIG. 4 is a cross-sectional view of an overclad during draw (ODD) apparatus for making an optical fiber preform according to embodiments of the invention, showing an overclad tube positioned around a preform core rod and collapsing around the preform core rod prior to optical fiber being drawn from the resulting preform.

Referring now to FIG. 4, an overclad during draw (ODD) apparatus 90 for making an optical fiber preform and optical fiber therefrom according to alternative embodiments of the invention is shown. The apparatus includes a furnace 92 or other suitable heat source positioned appropriately for heating the preform core rod 14 and the overclad tube 16. Thus, referring to the method shown in FIG. 3 with continuing reference to FIG. 4, according to alternative embodiments of the invention in which ODD arrangements and method steps are used, the heating step 76 and the drawing step 78 are performed using the same heat source 92.

In operation, the specific physical dimensions of the preform core rod 14 and the overclad tube 16 are determined and made available to the controller 44. The preform core rod 14 is inserted into the overclad tube 16 and, collectively, the two are moved axially into the furnace 92. The controller 44 uses the physical dimension information to coordinate movement of the spacer 34 and/or the support 32 to increase and/or decrease radial dimensions of the preform core rod 14 and/or the overclad tube 16. Because the controller 44 also controls the axial movement of the preform core rod 14 and the overclad tube 16 (e.g., into the furnace 92), the controller 44 coordinates the change in radial dimensions of the preform core rod 14 and/or the overclad tube 16 with the axial movement thereof to control the dimensions of the preform core rod 14 and/or the overclad tube 16 along the lengths thereof. In this manner, the controller 44 controls the overall radial dimensions of the preform core rod 14 and the overclad tube 16 to actively match the radial dimensions of the preform core rod 14 and corresponding portions of the surrounding overclad tube 16.

It will be apparent to those skilled in the art that many changes and substitutions can be made to the embodiments of the RIT methods and apparatus for making optical fiber preforms and optical fibers herein described without departing from the spirit and scope of the invention as defined by the appended claims and their full scope of equivalents. For example, embodiments of the invention are useful with other types RIT methods and apparatus, such as the co-pending application "Apparatus And Method For Making Multiple Overclad Optical Fiber Preforms And Optical Fiber Therefrom", Ser. No. 09/515,227, Atty. Docket: Dong 1-7-22-5, filed on Feb. 29, 2000 and assigned to the assignee of this application.

What is claimed is:

1. A method for making an overclad optical fiber preform, comprising the steps of:

positioning an overclad tube around a preform core rod;

heating the overclad tube along the length thereof in such a way that the overclad tube collapses onto the preform core to form the overclad optical fiber preform; and actively adjusting the radial size of a heated portion of at least one of the preform core rod and the overclad tube to improve matching of the radial size of the preform core rod and the overclad tube prior to the collapse of the overclad tube onto the preform core rod.

2. The method as recited in claim 1, wherein the adjusting step further comprises varying the size of a heated portion of the preform core rod relative to a corresponding axial position of the overclad tube.

3. The method as recited in claim 1, wherein the adjusting step includes increasing the radial size of the preform core rod by reducing the axial length of at least one first portion of the preform core rod and/or decreasing the radial size of the preform core rod by increasing the axial length of at least one second portion of the preform core rod.

4. The method as recited in claim 1, wherein the adjusting step further comprises varying the radial size of a heated portion of the overclad tube relative to a corresponding axial position of the preform core rod.

5. The method as recited in claim 1, wherein the adjusting step includes increasing the radial size of the overclad tube by decreasing the axial length of at least one first portion of the overclad tube and/or decreasing the radial size of the overclad tube by increasing the axial length of at least one second portion of the overclad tube.

6. The method as recited in claim 1, further comprising the step of establishing a pressure gradient between the interior of the overclad tube and the exterior of the overclad tube, wherein the pressure outside the overclad tube is greater than the pressure inside the overclad tube.

7. The method as recited in claim 1, further comprising the step of drawing an optical fiber from the overclad optical fiber preform.

8. The method as recited in claim 7, wherein the drawing step and the heating step are performed using the same heat source.

9. The method as recited in claim 1, wherein the positioning step further comprises positioning the overclad tube around the preform core rod in such a way that the overclad tube and the preform core rod are substantially coaxial.

10. A method for making an optical fiber, comprising the steps of:

positioning an overclad tube around a preform core rod;

establishing a pressure gradient across the overclad tube, wherein the pressure outside the overclad tube is greater than the pressure inside the overclad tube;

heating the overclad tube along the length thereof in such a way that the overclad tube collapses onto the preform core to form the overclad optical fiber preform;

actively adjusting the radial size of a heated portion of at least one of the preform core rod and the overclad tube to improve matching of the radial size of the preform core rod and the overclad tube prior to the collapse of the overclad tube onto the preform core rod; and drawing the optical fiber from the overclad optical fiber preform.

11. The method as recited in claim 10, wherein the adjusting step includes increasing the radial size of at least one first heated portion of the preform core rod relative to a corresponding axial position of the overclad tube by applying a compressive force to the preform core rod and/or decreasing the radial size of at least one second heated portion of the preform core rod relative to a corresponding axial position of the overclad tube by applying a drawing force to the preform core rod.

12. The method as recited in claim 10, wherein the adjusting step includes increasing the radial size of at least one first heated portion of the overclad tube relative to a corresponding axial position of the preform core rod by applying a compressive force to the overclad tube and/or decreasing the radial size of at least one second heated portion of the overclad tube relative to a corresponding axial position of the preform core rod by applying a drawing force to the overclad tube.

13. The method as recited in claim 10, wherein the drawing step and the heating step are performed using the same heat source.

* * * * *